United States Patent
Johnson

(10) Patent No.: US 9,934,672 B2
(45) Date of Patent: Apr. 3, 2018

(54) SYSTEMS AND METHODS OF CONSERVING BATTERY LIFE IN AMBIENT CONDITION DETECTORS

(71) Applicant: Honeywell International Inc., Morristown, NJ (US)

(72) Inventor: Dale H. Johnson, Elgin, IL (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 144 days.

(21) Appl. No.: 14/864,072

(22) Filed: Sep. 24, 2015

(65) Prior Publication Data
US 2017/0092097 A1    Mar. 30, 2017

(51) Int. Cl.
| | | |
|---|---|---|
| G08B 23/00 | (2006.01) | |
| G08B 17/00 | (2006.01) | |
| G08B 21/00 | (2006.01) | |
| G08B 29/00 | (2006.01) | |
| G08B 19/00 | (2006.01) | |
| G01W 1/00 | (2006.01) | |
| G01N 15/06 | (2006.01) | |
| G08B 25/00 | (2006.01) | |
| G06F 1/32 | (2006.01) | |

(52) U.S. Cl.
CPC ......... *G08B 25/002* (2013.01); *G06F 1/3231* (2013.01); *Y02B 60/1289* (2013.01)

(58) Field of Classification Search
None
See application file for complete search history.

(56) References Cited

U.S. PATENT DOCUMENTS

| | | | | |
|---|---|---|---|---|
| 3,599,195 A | * | 8/1971 | Boyko | G08B 13/2497 334/45 |
| 4,450,437 A | * | 5/1984 | Ho | G08B 21/0415 340/540 |
| 4,746,910 A | * | 5/1988 | Pfister | G08B 13/19 250/340 |
| 4,849,635 A | * | 7/1989 | Sugimoto | G08B 13/19 250/342 |
| 5,309,145 A | * | 5/1994 | Branch | G08B 19/005 340/540 |
| 5,703,368 A | * | 12/1997 | Tomooka | G08B 13/19 250/349 |
| 5,900,806 A | * | 5/1999 | Issa | B60R 25/1003 180/287 |
| 5,923,250 A | * | 7/1999 | Pildner | G08B 13/191 250/342 |
| 6,127,926 A | * | 10/2000 | Dando | G08B 13/2491 340/522 |
| 6,150,935 A | * | 11/2000 | Anderson | G08B 17/107 340/506 |

(Continued)

*Primary Examiner* — Steven Lim
*Assistant Examiner* — Muhammad Adnan
(74) *Attorney, Agent, or Firm* — Husch Blackwell LLP

(57) ABSTRACT

Systems and methods of effectively communicating alarm conditions by making efficient use of the limited battery life in ambient condition detectors are provided. In some systems and methods, an ambient condition detector in a monitored region can be associated with a motion sensor. When the motion sensor detects motion in the monitored region, the detector can exit a soft alarm mode and enter a full alarm mode for a predetermined period of time.

18 Claims, 5 Drawing Sheets

(56) References Cited

U.S. PATENT DOCUMENTS

| | | | | |
|---|---|---|---|---|
| 6,317,040 B1* | 11/2001 | Ikeda | | G08B 13/19 |
| | | | | 340/522 |
| 6,359,564 B1* | 3/2002 | Thacker | | G08B 5/00 |
| | | | | 340/330 |
| 7,075,431 B2* | 7/2006 | Buckley | | G01J 5/34 |
| | | | | 250/342 |
| 7,482,918 B2* | 1/2009 | Allen | | B60R 25/1009 |
| | | | | 340/506 |
| 8,988,232 B1* | 3/2015 | Sloo | | G01N 27/02 |
| | | | | 340/602 |
| 9,105,175 B1* | 8/2015 | Cantolino | | F24H 9/16 |
| 9,454,893 B1* | 9/2016 | Warren | | G08B 29/10 |
| 2002/0111198 A1* | 8/2002 | Heie | | G08B 3/1025 |
| | | | | 455/574 |
| 2005/0285941 A1* | 12/2005 | Haigh | | G08B 13/19602 |
| | | | | 348/155 |
| 2006/0055534 A1* | 3/2006 | Fergusson | | G01D 5/2405 |
| | | | | 340/562 |
| 2008/0106422 A1* | 5/2008 | Sparks | | E04H 4/14 |
| | | | | 340/573.6 |
| 2010/0245088 A1* | 9/2010 | Meier | | G08B 13/08 |
| | | | | 340/545.1 |
| 2011/0033830 A1* | 2/2011 | Cherian | | G09B 5/02 |
| | | | | 434/236 |
| 2012/0188081 A1* | 7/2012 | Van Katwijk | | G01S 13/56 |
| | | | | 340/541 |
| 2012/0194334 A1* | 8/2012 | Worthington | | G08B 21/043 |
| | | | | 340/521 |
| 2013/0057404 A1* | 3/2013 | Thibault | | G08B 13/08 |
| | | | | 340/545.1 |
| 2013/0215266 A1* | 8/2013 | Trundle | | G08B 13/19602 |
| | | | | 348/143 |
| 2014/0031082 A1* | 1/2014 | Zishaan | | G08B 21/12 |
| | | | | 455/556.1 |
| 2014/0218195 A1* | 8/2014 | Buckley | | G08B 13/19 |
| | | | | 340/541 |
| 2014/0313882 A1* | 10/2014 | Rucker | | H04W 4/005 |
| | | | | 370/219 |
| 2015/0074259 A1* | 3/2015 | Ansari | | H04L 67/02 |
| | | | | 709/224 |
| 2015/0118630 A1* | 4/2015 | Ewell | | H05B 1/0261 |
| | | | | 432/1 |
| 2015/0347683 A1* | 12/2015 | Ansari | | G06F 19/322 |
| | | | | 726/7 |
| 2016/0042635 A1* | 2/2016 | Rosebraugh | | G08B 21/245 |
| | | | | 340/573.1 |
| 2016/0189533 A1* | 6/2016 | Modi | | G08B 31/00 |
| | | | | 340/507 |
| 2017/0018167 A1* | 1/2017 | Dey | | G08B 25/008 |

* cited by examiner

SYSTEMS AND METHODS OF CONSERVING BATTERY LIFE IN AMBIENT CONDITION DETECTORS

FIELD

The present invention relates generally to ambient condition detectors. More particularly, the present invention relates to systems and methods of effectively communicating alarm conditions by making efficient use of the limited battery life in ambient condition detectors.

BACKGROUND

Ambient condition detectors are known in the art. When an ambient condition detector senses an alarm condition, the detector can enter a full alarm mode. It is to be understood that the full alarm mode as described herein can include an alarm mode during which the detector transmits an alarm signal followed by a brief silent period of time before retransmitting the alarm signal. Those of skill in the art will understand that the alarm signal can include, but is not limited to any of the following signals, alone or in combination: (1) a continuous alarm signal, for example, a continuous sound or steady tone, (2) a beeping sound, (3) an alarm signal is that is repeatedly on for a predetermined period of time and off for a predetermined period of time, (4) a repeating pattern of beeping, sound, or spoken words, for example, three or four beeps, (5) an alarm signal with the temporal-four pattern required by UL 2034, or (6) an alarm signal with the temporal-three pattern required by ANSI/ASA S3.41 and ISO 8201. Those of skill in the art will also understand that the brief silent period of time can be a predetermined period of time. For example, when the alarm signal includes the temporal-four pattern, the brief silent period of time can be five seconds. Furthermore, when the alarm signal includes the temporal-three pattern, the brief silent period of time can be 1.5 seconds.

However, known detectors can be powered by a battery, and operating in the full alarm mode can drain the battery in a short period of time. Even when the detector is hard wired to a control panel and receives power therefrom, the control panel can run on a backup battery during a power outage, and operating in the full alarm mode during such a power outage can drain the backup battery of the control panel. Accordingly, after the detector has been in the full alarm mode for a predetermined period of time, known detectors can transition into a soft alarm mode. It is to be understood that the soft alarm mode as described herein includes an alarm mode during which the detector transmits an alarm signal followed by an extended silent period of time before retransmitting the alarm signal. Those of skill in the art will understand that the alarm signal can include, but is not limited to any of the alarm signals described above. Those of skill in the art will also understand that the extended period of time can be a predetermined period of time that is longer than the brief period of time of the full alarm mode. For example, the extended period of time can be sixty seconds.

FIG. 1 is a flow diagram of a method 100 known in the art. For example as seen in FIG. 1, the method 100 can include an ambient condition detector sensing an alarm condition, for example, carbon monoxide, as in 110. Then, the method 100 can include the ambient condition detector entering a full alarm mode for a predetermined period of time as in 120. After expiration of the predetermined period of time, the method 100 can include the ambient condition detector entering a soft alarm mode as in 130.

Alarm signals transmitted during the soft alarm mode have been considered to be a sufficient alarm notification because a person entering a monitored region after the detector has entered the soft alarm mode can still hear the intermittent alarm signals transmitted by the detector. Furthermore, when the detector communicates with the control panel, it can be assumed that the control panel has notified a central monitoring station about the alarm and that the central monitoring station has had enough time to take the appropriate action, for example, sending a fire truck to address a carbon monoxide or smoke detector in alarm.

However, emerging trends have ambient condition detectors in communication with a user device, such as a smart phone or other handheld device, instead of the control panel or central monitoring station. Accordingly, there is no guarantee that a user will take the appropriate action to address the detector in alarm. Furthermore, when the user enters the monitored region after the detector has entered the soft alarm mode, the user may hear the intermittent alarm signals, but because the signals stop for the extended period of time in between transmissions, the user may disregard the alarm.

In view of the above, there is a continuing, ongoing need for improved systems and methods.

DETAILED DESCRIPTION

Figure 1:
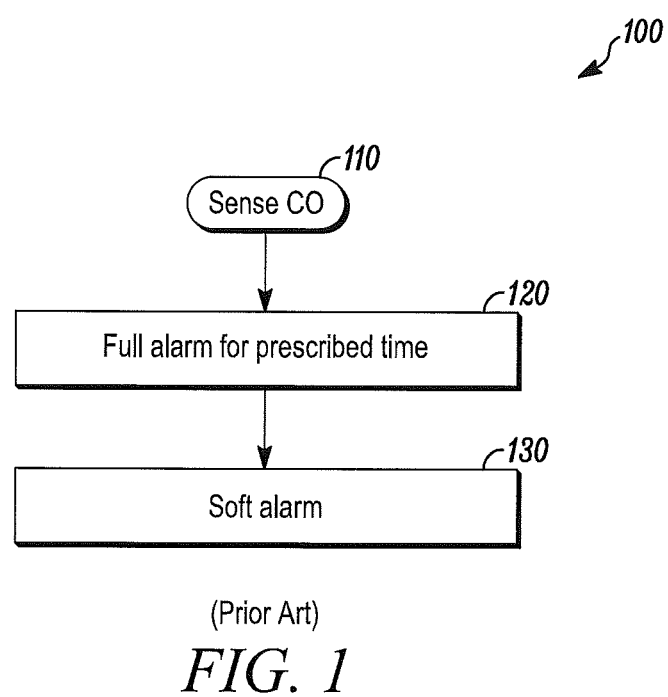
FIG. 1 is a flow diagram of a method known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods of effectively communicating alarm conditions by making efficient use of the limited battery life in ambient condition detectors. It is to be understood that the ambient condition detectors as disclosed herein can include carbon monoxide (CO) detectors, smoke detectors, temperature detectors, or any other life safety threat detectors as would be understood by one of ordinary skill in the art.

An ambient condition detector can be located in a monitored region. After the detector has been in a full alarm mode for a first predetermined period of time, the detector can enter a soft alarm mode as is known in the art. However, in accordance with disclosed embodiments, the detector can be linked to a motion sensor. When the motion sensor indicates that a person is within the monitored region, the detector can exit the soft alarm mode and return to the full alarm mode for a second predetermined period of time.

In some embodiments, the motion sensor as disclosed herein can include a motion sensor mounted on the ambient condition detector, for example, in or on a housing of the ambient condition detector. In these embodiments, the motion sensor can operate as part of the ambient condition detector.

In some embodiments, the motion sensor as disclosed herein can include one or more motion sensors, for example, PIR motion sensors, located in a plurality of different locations within the monitored region in which the ambient condition detector is located. In these embodiments, upon detecting motion, the motion sensors can transmit a signal to a control panel, security panel, or central monitoring station, which can transmit a corresponding signal to the ambient condition detector. Additionally or alternatively, upon detecting the motion, the motion sensors can transmit a signal directly to the ambient condition detector, for example, via radio communication. The signal transmitted to the ambient condition detector can include an indication that the motion is detected in the monitored region or instructions to enter the full alarm mode.

In some embodiments, the motion sensor as disclosed herein can include a second device within the monitored region in which the ambient condition detector is located, including, but not limited to a keypad of a security panel, a door, a thermostat, a television, a radio, or a telephone. When the second device or a sensor associated therewith detects the motion, such as a key on the keypad being depressed, the door being opened or closed, the thermostat being manually adjusted, the television or radio being turned on or off, or a telephone call being made, the second device or the associated sensor can transmit a signal to the control panel, security panel, or central monitoring station or directly to the ambient condition detector to notify the ambient condition detector about the detected motion or to instruct the ambient condition detector to enter the full alarm mode.

Figure 2:
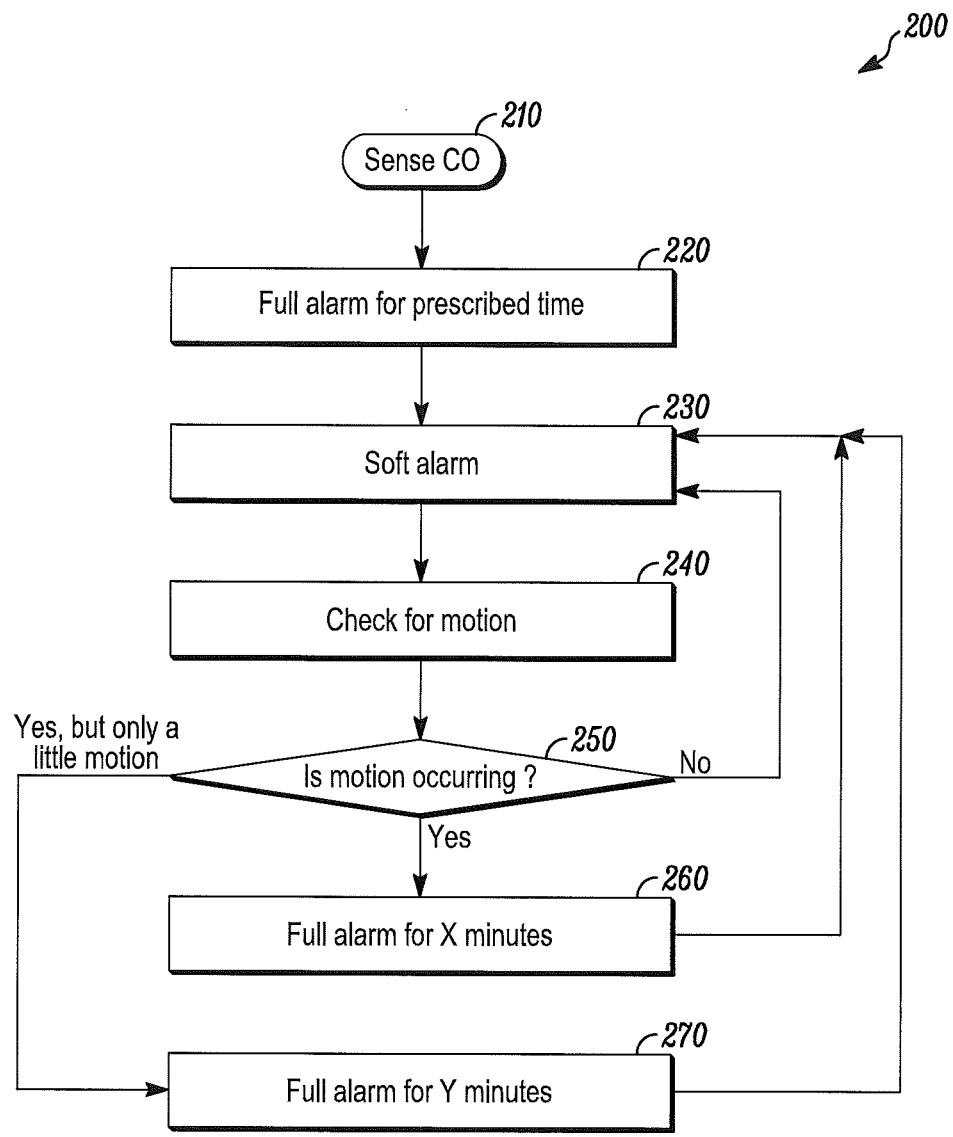
FIG. 2 is a flow diagram of a method in accordance with disclosed embodiments.

FIG. 2 is a flow diagram of a method 200 in accordance with disclosed embodiments. As seen in FIG. 2, the method 200 can include an ambient condition detector sensing an alarm condition, for example, carbon monoxide, as in 210. Then, the method 200 can include the ambient condition detector entering a full alarm mode for a first predetermined period of time as in 220. After expiration of the first predetermined period of time, the method 200 can include the ambient condition detector entering a soft alarm mode as in 230.

When the ambient condition detector is in the soft alarm mode, the method 200 can include checking for motion as in 240 and determining whether the motion is detected in a monitored region as in 250. It is to be understood that checking for the motion as in 240 can include any method as would be understood by one or ordinary skill in the art for determining whether an individual is present within the monitored region. For example, checking for the motion can include monitoring an output of a PIR motion sensor or other dedicated motion sensor in the monitored region. Checking for the motion can additionally or alternatively include monitoring a microphone that detects speech in the monitored region or monitoring the opening or closing of a door, the actuation of a light switch, the depression of a button on a system keypad, or the adjustment of a radio, television, or thermostat in the monitored region.

If the method 200 determines that the motion is not detected in the monitored region as in 250, then the ambient condition detector can remain in the soft alarm mode as in 230. However, if the method 200 determines that the motion is detected in the monitored region as in 250, then the method 200 can determine the level of the motion detected. If a predetermined amount of the motion is detected, then the method 200 can include the ambient condition detector entering the full alarm mode for a second predetermined period of time, for example, X minutes, as in 260 before reentering the soft alarm mode as in 230. If less than the predetermined amount of the motion is detected, then the method 200 can include the ambient condition detector entering the full alarm mode for a third predetermined period of time, for example, Y minutes, as in 270 before reentering the soft alarm mode as in 230. In some embodiments, X can be greater than Y.

Figure 4:
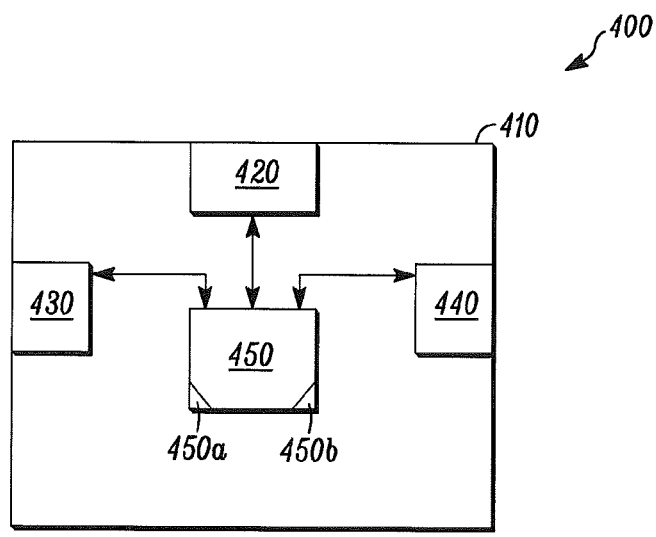
FIG. 4 is a block diagram of an ambient condition detector in accordance with disclosed embodiments.

Some embodiments disclosed herein can include a single ambient condition detector that includes an embedded motion sensor. For example, FIG. 4 is a block diagram of an ambient condition detector 400 in accordance with disclosed embodiments. As seen in FIG. 4, the detector 400 can include a housing 410, an ambient condition sensor 420, a motion sensor 430, an alarm sounding device 440, control circuitry 450, one or more programmable processors 450a, and executable control software 450b as would be understood by one or ordinary skill in the art. The executable control software 450b can be stored on a transitory or non-transitory computer readable medium, including, but not limited to local computer memory, RAM, optical storage media, magnetic storage media, flash memory, and the like.

In some embodiments, the control circuitry 450, programmable processor 450a, and control software 450b can execute and control the methods as described above and herein. For example, the control circuitry 450, programmable processor 450a, and control software 450b can receive a signal from the motion sensor 430 to check for the motion as in 240, the control circuitry 450, programmable processor 450a, and control software 450b can determine whether the motion is detected as in 250 and determine the level of the motion, and the control circuitry 450, programmable processor 450a, and control software 450b can transmit a signal to the alarm sounding device 440 to control entry into and out of the full alarm mode as in 230, 260, and 270.

Figure 5:
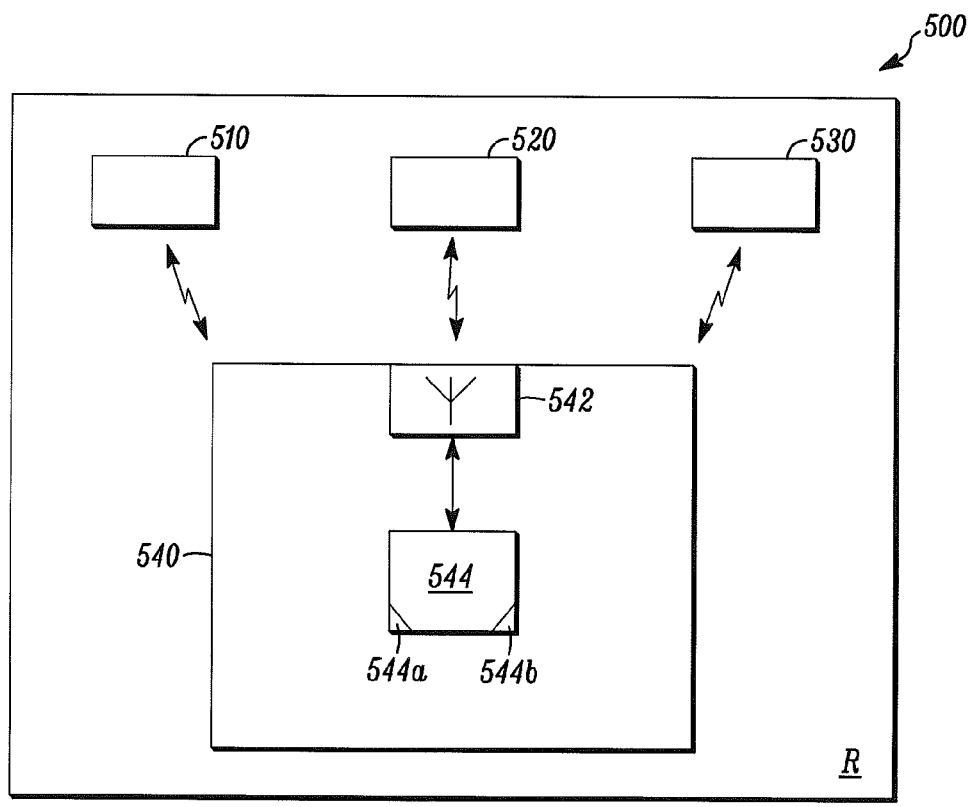
FIG. 5 is a block diagram of a system in accordance with disclosed embodiments.

Some embodiments disclosed herein can include a system of devices communicating with one another. For example, FIG. 5 is a block diagram of a system 500 in accordance with disclosed embodiments. As seen in FIG. 5, the system 500 can include one or more ambient condition detectors 510 in a monitored region R, one or more alarm sounding devices 520 in the monitored region R, one or more motion sensors 530 in the monitored region R, and a security panel 540 in communication with the ambient condition detectors 510, the alarm sounding devices 520, and the motion sensors 530. Although shown as separate devices in FIG. 5, it is to be understood that an ambient condition detector 510 and an alarm sounding device 520 can be a single device or contained within a single housing. Furthermore, although the security panel 540 is shown within the monitored region R in FIG. 5, it is to be understood that the security panel 540 can be located outside of the monitored region R.

The security panel 540 can include a transceiver 542, control circuitry 544, one or more programmable processors 544a, and executable control software 544b as would be understood by one of ordinary skill in the art. The executable control software 544b can be stored on a transitory or non-transitory computer readable medium, including, but not limited to local computer memory, RAM, optical storage media, magnetic storage media, flash memory, and the like. In some embodiments, the control circuitry 544, programmable processor 544a, and control software 544b can execute and control the methods described above and herein. For example, the control circuitry 544, programmable processor 544a, and control software 544b can communicate with the motion sensors 530, via the transceiver 542, to check for the motion as in 240, the control circuitry 544, programmable processor 544a, and control software 544b can determine whether the motion is detected as in 250 and determine a level of the motion detected, and the control circuitry 544, programmable processor 544a, and control software 544b can communicate with the ambient condition detectors 510 and alarm sounding devices 520 to control entry into and out of the full alarm mode as in 230, 260, and 270.

Figure 3:
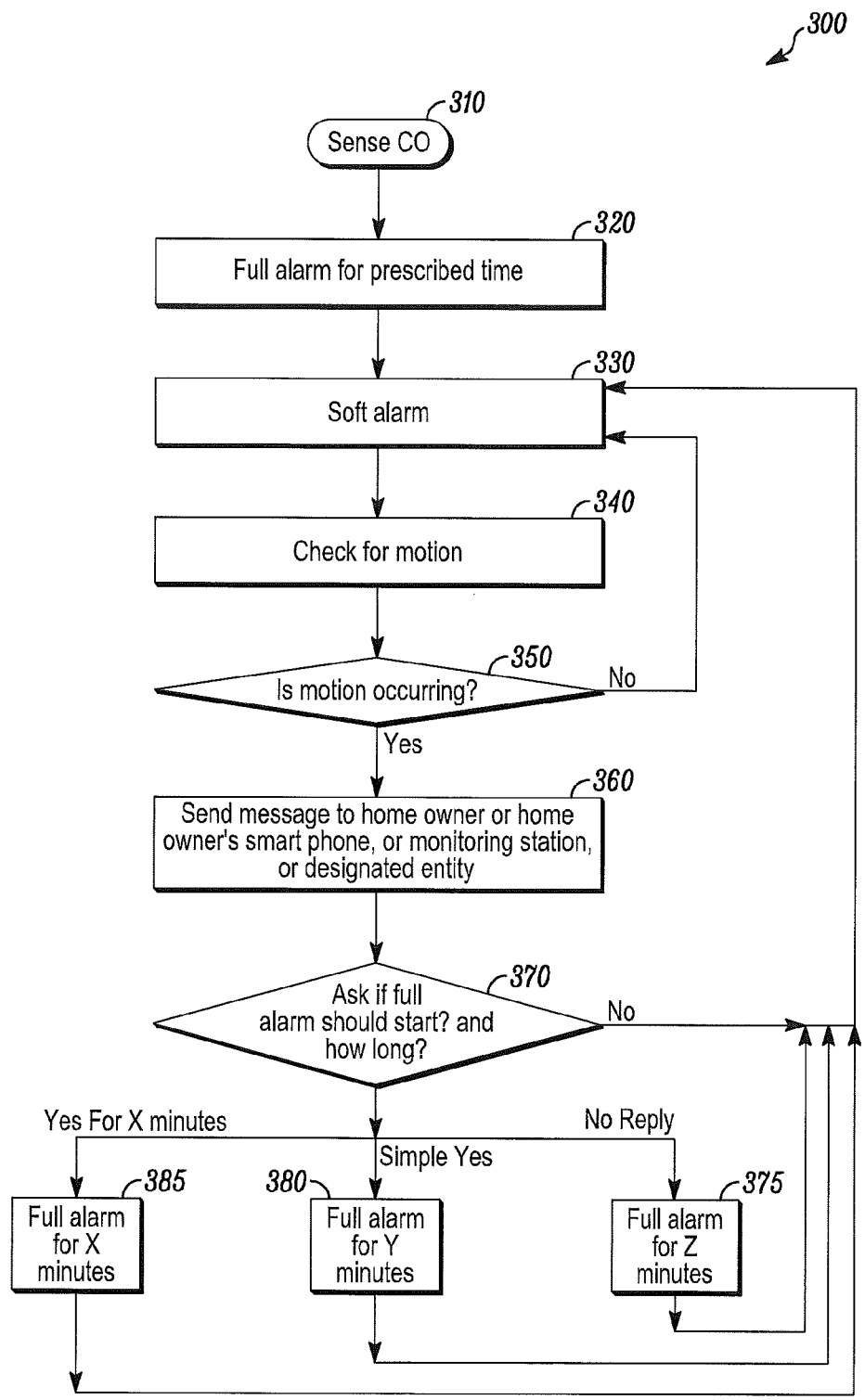
FIG. 3 is a flow diagram of a method in accordance with disclosed embodiments.

FIG. 3 is a flow diagram of an alternate method 300 in accordance with disclosed embodiments. As seen in FIG. 3, the method 300 can include an ambient condition detector sensing an alarm condition, for example, carbon monoxide, as in 310. Then, the method 300 can include the ambient condition detector entering a full alarm mode for a first predetermined period of time as in 320. After expiration of the first predetermined period of time, the method 300 can include the ambient condition detector entering a soft alarm mode as in 330.

When the ambient condition detector is in the soft alarm mode, the method 300 can include checking for motion as in 340 and determining whether the motion is detected in a monitored region as in 350. If the method 300 determines that the motion is not detected in the monitored region as in 350, then the ambient condition detector can remain in the soft alarm mode as in 330.

However, if the method 300 determines that the motion is detected in the monitored region as in 350, then the method 300 can transmit a message to a third party device as in 360. For example, the method 300 can transmit the message to an owner of the monitored region, a smart phone of the owner of the monitored region, a control panel, a remote monitoring station, or any other designated entity or device as would be desired by one of ordinary skill in the art. The method 300 can solicit a response from the third party device as in 370 to determine whether the ambient condition detector should enter the full alarm mode and if so, for how long. Indeed, the third party device or a user thereof may most effectively interpret inconclusive signs of activity or motion in a monitored region.

If the third party device transmits a signal indicating that the ambient condition detector should enter the full alarm mode for a period of time specified by the user of the third party device, for example, X minutes, then the method 300 can include the ambient condition detector entering the full alarm mode for the user-specified period of time, for example, X minutes, as in 385 before reentering the soft alarm mode as in 330. If the third party device transmits a signal simply indicating that the ambient condition detector should enter the full alarm mode without any specification of a period of time, then the method 300 can include the ambient condition detector entering the full alarm mode for a second predetermined period of time, for example, Y minutes, as in 380 before reentering the soft alarm mode as in 330. However, if the third party device does not provide a response, then the method 300 can include the ambient condition detector entering the full alarm mode for a third predetermined period of time, for example, Z minutes, as in 375 before reentering the soft alarm mode as in 330. In some embodiments, Y can be equal to Z.

Figure 6:
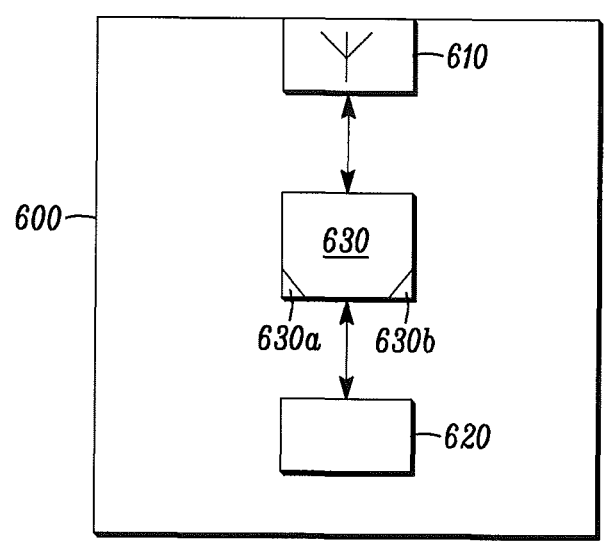
FIG. 6 is a block diagram of a third party device in accordance with disclosed embodiments.

FIG. 6 is a block diagram of a third party device 600 in accordance with disclosed embodiments. As seen in FIG. 6, the device 600 can include a transceiver 610, a user interface device 620, control circuitry 630, one or more programmable processors 630a, and executable control software 630b as would be understood by one of ordinary skill in the art. The executable control software 630b can be stored on a transitory or non-transitory computer readable medium, including, but not limited to local computer memory, RAM, optical storage media, magnetic storage media, flash memory, and the like. In some embodiments, the control circuitry 630, programmable processor 630a, and control software 630b can execute and control the methods described above and herein. For example, the control circuitry 630, programmable processor 630a, and control software 630b can communicate with motion sensors, via the transceiver 610, to check for the motion as in 340, the control circuitry 630, programmable processor 630a, and control software 630b can determine whether the motion is detected as in 350, the control circuitry 630, programmable processor 630a, and control software 630b can receive user input, via the user interface device 620, as in 370, and the control circuitry 630, programmable processor 630a, and control software 630b can communicate with ambient condition detectors and alarm sounding devices, via the transceiver 610, to control entry into and out of the full alarm mode as in 330, 375, 380, and 385.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
responsive to receiving an alarm notification, a control panel device causing an ambient condition detector in a monitored region to transition to a full alarm mode for a first predetermined period of time;
the control panel device causing the ambient condition detector in the monitored region to transition to a soft alarm mode after expiration of the first predetermined period of time;
the control panel device determining a presence of a current amount of motion in the monitored region above a predetermined threshold amount of motion; and
the control panel device causing the ambient condition detector in the monitored region to transition from the soft alarm mode to the full alarm mode in response to determining the presence of the current amount of motion in the monitored region above the predetermined threshold amount of motion.

2. The method of claim 1 further comprising the control panel device causing the ambient condition detector in the monitored region to transition from the soft alarm mode to the full alarm mode for a second predetermined period of time when the current amount of motion equals a first predetermined amount of motion.

3. The method of claim 2 further comprising the control panel device causing the ambient condition detector in the monitored region to transition from the soft alarm mode to the full alarm mode for a third predetermined period of time when the current amount of motion equals a second predetermined amount of motion less than the first predetermined amount of motion.

4. The method of claim 1 further comprising the control panel device receiving a signal from a motion sensor indicative of the current amount of motion in the monitored region.

5. The method of claim 1 further comprising the control panel device transmitting a signal to an alarm sounding device instructing the alarm sounding device to emit an alarm signal in compliance with the full alarm mode.

6. The method of claim 1 further comprising:
the control panel device transmitting a first signal to a third party device soliciting user input upon determining the presence of the current amount of motion in the monitored region; and
the control panel device causing the ambient condition detector in the monitored region to transition from the soft alarm mode to the full alarm mode in response to receiving a second signal from the third party device indicative of the user input.

7. A method comprising:
responsive to receiving an alarm notification, a control panel device causing an ambient condition detector in a monitored region to transition to a full alarm mode for a first predetermined period of time;
the control panel device causing the ambient condition detector in the monitored region to transition to a soft alarm mode after expiration of the first predetermined period of time;
the control panel device receiving a first signal indicative of a presence of a current amount of motion in the monitored region above a predetermined threshold amount of motion;
the control panel device soliciting user input in response to the first signal;
the control panel device receiving the user input; and
the control panel device transmitting a second signal with instructions for transitioning the ambient condition detector in the monitored region from the soft alarm mode to the full alarm mode in response to the control panel device receiving the user input.

8. The method of claim 7 wherein the instructions for transitioning the ambient condition detector from the soft alarm mode to the full alarm mode include the instructions for operating in the full alarm mode for a second predetermined period of time.

9. The method of claim 7 wherein the user input includes a user-specified period of time, and wherein the instructions for transitioning the ambient condition detector from the soft alarm mode to the full alarm mode include the instructions for operating in the full alarm mode for the user-specified period of time.

10. A system comprising:
an alarm sounding device; and
a control panel device including a programmable processor coupled to the alarm sounding device,
wherein, responsive to receiving an alarm notification, the programmable processor causes the alarm sounding device to enter a full alarm mode for a first predetermined period of time,
wherein the programmable processor causes the alarm sounding device to enter a soft alarm mode after expiration of the first predetermined period of time,
wherein the programmable processor receives a first signal from a motion sensor indicative of a current amount of motion in a monitored region above a predetermined threshold amount of motion, and
wherein, responsive to receiving the first signal, the programmable processor transmits a second signal to the alarm sounding device to instruct the alarm sounding device to transition to the full alarm mode.

11. The system of claim 10 wherein the programmable processor, the control panel device, the motion sensor, and the alarm sounding device are included within a single housing.

12. The system of claim 11 wherein the single housing includes an ambient condition detector.

13. The system of claim 10 wherein the control panel device includes a transceiver for communicating with the motion sensor and the alarm sounding device, and wherein the motion sensor and the alarm sounding device are located in the monitored region.

14. The system of claim 13 wherein the control panel device is located in the monitored region.

15. The system of claim 10 wherein the alarm sounding device is located within a housing that includes an ambient condition detector.

16. The system of claim 10 wherein, responsive to the first signal, the programmable processor solicits user input from a user device, receives the user input, and responsive to receiving the user input, transmits the second signal.

17. The system of claim 16 wherein the user device includes a user interface device.

18. The system of claim 17 wherein the user device includes a smart phone.

* * * * *